(12) United States Patent
Ryther et al.

(10) Patent No.: US 12,298,237 B2
(45) Date of Patent: May 13, 2025

(54) LARGE DYNAMIC RANGE KINETIC MONITOR

(71) Applicant: Ecolab USA Inc., St. Paul, MN (US)

(72) Inventors: Robert James Ryther, Mendota Heights, MN (US); Paul R. Kraus, Apple Valley, MN (US)

(73) Assignee: Ecolab USA Inc., St. Paul, MN (US)

( * ) Notice: Subject to any disclaimer, the term of this patent is extended or adjusted under 35 U.S.C. 154(b) by 638 days.

(21) Appl. No.: 17/444,131

(22) Filed: Jul. 30, 2021

(65) Prior Publication Data

US 2022/0034798 A1 Feb. 3, 2022

Related U.S. Application Data

(60) Provisional application No. 63/059,531, filed on Jul. 31, 2020.

(51) Int. Cl.
*G01N 21/359* (2014.01)
*G01N 21/05* (2006.01)
*G01N 21/25* (2006.01)

(52) U.S. Cl.
CPC .......... *G01N 21/359* (2013.01); *G01N 21/05* (2013.01); *G01N 21/255* (2013.01); *G01N 2201/0627* (2013.01)

(58) Field of Classification Search
CPC .... G01N 21/359; G01N 21/05; G01N 21/255; G01N 2201/0627; G01N 21/31; G01N 21/65; G01N 24/08; G01N 2021/3595; G01N 2021/7763; G01N 2021/7783; G01N 21/85; G01N 21/78
See application file for complete search history.

(56) References Cited

U.S. PATENT DOCUMENTS

| | | |
|---|---|---|
| 5,438,002 A | 8/1995 | Mallard de la Varende et al. |
| 5,695,719 A | 12/1997 | Lynggaard et al. |
| 7,349,760 B2 | 3/2008 | Wei et al. |
| 7,556,772 B2 | 7/2009 | Horan et al. |
| 8,071,390 B2 | 12/2011 | Tokhtuev et al. |
| 8,076,154 B2 | 12/2011 | Erickson et al. |
| 8,076,155 B2 | 12/2011 | Tokhtuev et al. |
| 8,119,412 B2 | 2/2012 | Kraus |
| 8,143,070 B2 | 3/2012 | Tokhtuev et al. |
| 8,178,352 B2 | 5/2012 | Tokhtuev et al. |
| 8,236,573 B2 | 8/2012 | Tokhtuev et al. |
| 8,257,650 B2 | 9/2012 | Chow et al. |
| 8,748,191 B2 | 6/2014 | Kraus et al. |

(Continued)

OTHER PUBLICATIONS

International Search Report and Written Opinion dated Oct. 27, 2021 relating to PCT Application No. PCT/US2021/043928, 10 pages.

*Primary Examiner* — Jennifer Wecker
*Assistant Examiner* — Britney N. Washington
(74) *Attorney, Agent, or Firm* — Stinson LLP

(57) ABSTRACT

Disclosed herein are systems and methods for measuring one or more target analyte concentrations, particularly peroxyacid compounds, in a process solution, for example, in industrial and commercial water. These systems and methods include automated methods to measure the target analyte concentration in the process solution. The methods have the advantage of providing a large dynamic range for measurement and can be used in a wider range of process solutions.

19 Claims, 2 Drawing Sheets

(56) References Cited

U.S. PATENT DOCUMENTS

| | | | |
|---|---|---|---|
| 8,968,680 B2 | 3/2015 | Mazume et al. | |
| 8,980,636 B2 | 3/2015 | Bolduc et al. | |
| 9,194,793 B2 | 11/2015 | Adachi et al. | |
| 9,575,083 B2 | 2/2017 | Nishigaki | |
| 9,766,183 B2 | 9/2017 | Kraus et al. | |
| 10,031,081 B2 | 7/2018 | Li et al. | |
| 10,113,962 B2 | 10/2018 | Adachi et al. | |
| 2012/0028364 A1* | 2/2012 | Kraus | G01N 21/84 436/127 |
| 2012/0173164 A1* | 7/2012 | Steuerwald | G01N 35/08 73/61.59 |
| 2012/0285224 A1* | 11/2012 | Zachmann | G01N 35/1097 73/64.56 |
| 2015/0346080 A1 | 12/2015 | Masunishi et al. | |
| 2017/0138973 A1* | 5/2017 | Gerlinger | G01N 35/00712 |

* cited by examiner

LARGE DYNAMIC RANGE KINETIC MONITOR

CROSS REFERENCE TO RELATED APPLICATIONS

This application claims priority to U.S. Provisional Patent Application Ser. No. 63/059,531 filed on Jul. 31, 2020, the disclosure of which is incorporated herein by reference in its entirety.

FIELD OF THE INVENTION

Disclosed herein are systems and methods for measuring one or more target analyte concentrations, particularly peroxyacid compounds, in a process solution, for example, in industrial and commercial water. These systems and methods include automated methods to measure the target analyte concentration in the process solution. The methods have the advantage of providing a large dynamic range for measurement and can be used in a wider range of process solutions.

BACKGROUND OF THE INVENTION

Various systems and methods for measuring concentrations of analytes in process samples are known. Reagents are added to the process sample wherein the reagent can react with the analyte to produce a chemical change that provides a detectable change in the process sample.

For example, antimicrobial compositions are used in a variety of automated processing and cleaning applications to reduce microbial or viral populations on hard or soft surfaces or in a body or stream of water. Antimicrobial compositions are used in various applications including kitchens, bathrooms, factories, hospitals and dental offices. Antimicrobial compositions are also useful in the cleaning or sanitizing of containers, processing facilities or equipment in the oil field, food service, or food processing industries. In particular, the food processing applications can involve processing of poultry and vegetables. A category of active antimicrobial component are peracids, such as peroxycarboxylic acid (peracid), peroxyacid, peroxyacetic acid, peracetic acid, peroctanoic acid, peroxyoctanoic acid and others.

The concentration of active components in the composition is chosen to achieve the requisite level of antimicrobial activity. In compositions where one or more peracids are the active component, and in the instance of a recirculating process, the concentration of hydrogen peroxide tends to increase over time while the concentration of peracid decreases. However, in order to maintain the requisite level of antimicrobial activity, the amount of peracid in the composition must be maintained at a defined minimum concentration. In addition, once the amount of hydrogen peroxide in the composition reaches a defined maximum concentration level, the use composition may exceed the maximum concentration of hydrogen peroxide in the solution that may be adequately rinsed from the bottle. The allowable amount of residual hydrogen peroxide is an FDA requirement and depends upon the type and manufacturer of the filler. Once the hydrogen peroxide concentration exceeds the maximum concentration, the spent composition is discarded and a new composition generated.

To ensure that the amount of peracid is maintained at or above some minimum concentration and to determine when the amount of hydrogen peroxide reaches or exceeds a maximum concentration, it is necessary to determine the concentration of peracid(s) and hydrogen peroxide in the composition. To determine both the peracid concentration and the hydrogen peroxide concentration in a composition has required multiple time consuming manual titrations, several different reagents and relatively large volumes of use composition. Thus, a need for an automated large dynamic range method for determining concentrations of analytes in process samples is needed.

SUMMARY OF THE INVENTION

Disclosed herein are sensors and methods of sensing analytes that provide advantageous dynamic range for measuring kinetics of reactions. For example, disclosed is an automated sensor comprising a sample treatment system comprising a sample pump and a sample filter. The sample pump is for pumping a sample into a reaction manifold, wherein the sample comprises an analyte. The sensor comprises a first reagent pump for pumping a first reagent into the reaction manifold; the reaction manifold for mixing the sample with the first reagent, the reaction manifold being in fluid communication with the sample treatment system and the first reagent pump. The sensor also comprises a measurement chamber in fluid communication with the reaction manifold; and a first detector in fluid communication with the measurement chamber for detecting a property of the analyte in the measurement chamber. The sensor further comprises a waste line for removing waste from the measurement chamber and having a fluid communication to the measurement chamber; a waste pump in fluid communication with the waste line for removing the sample and the first reagent from the sensor. The sensor also comprises a rinse line in fluid communication with the measurement chamber; and a controller communicatively coupled to the sample pump, the first reagent pump, and the first detector, wherein the controller controls the sample pump to set the flow rate of the sample, controls the first reagent pump to set the flow rate of the first reagent, and receives data from the detector to detect the property of the analyte.

The automated sensors described herein can have the sample be a continuously flowing and refreshed sample.

The automated sensor can further comprise a rinse pump for pumping a rinse solution and being in fluid communication with the rinse line and the measurement chamber.

The automated sensor can also further comprise a second reagent pump for pumping a second reagent into the reaction manifold and being in fluid communication with the reaction manifold.

The automated sensor can have the first detector be a light emitting diode detector, a conductivity detector, an electrochemical detector, a ultraviolet detector, a visible light detector, an infrared light detector, a Raman detector, a Fourier transform infrared detector, a broad spectrum detector, or a nuclear magnetic resonance detector. Preferably, the first detector is a light emitting diode detector.

The first detector can comprise multiple light emitting diode light sources and multiple light emitting diode light detectors. Preferably, the first detector comprises at least two light emitting diode sources and at least two light emitting diode light detectors. More preferably, the first detector comprises at least three light emitting diode sources and at least three light emitting diode light detectors.

The multiple light emitting diode sources can each emit different wavelengths of light and the multiple light emitting diode light detectors detect those different wavelengths of light.

The first detector can also include a broad spectrum light source and a multi-wavelength detector that can detect the particular wavelength selected.

The automated sensor has the reaction manifold placed downstream from the sample treatment system and first reagent pump.

The automated sensor described herein can have the measurement chamber be downstream from the reaction manifold.

The automated sensor has the first detector located within the measurement chamber.

The automated sensor can further comprise a second detector downstream from the first detector.

The disclosure is also directed to a method for quantification of a target analyte concentration in a sample. The method comprises flowing the sample through an analyzer comprising a reaction manifold, a measurement chamber comprising a detector, and a waste line. The method also comprises flowing a first reagent through the analyzer to contact the sample; detecting a property of the target analyte and calculating the concentration of the target analyte in the sample. The method additionally includes rinsing the analyzer by flowing a rinse solution through the analyzer; and draining the analyzer by pumping the sample, the first reagent, and the rinse solution out of the analyzer.

The methods described herein have a second reagent flowed through the analyzer to contact the sample.

The methods have an internal standard flowed into the analyzer with the sample and the internal standard contains a known concentration of a known analyte.

The methods have the sample continuously flowed through and refreshed in the analyzer.

The methods described herein can have the flow of the sample stopped and the target analyte concentration measured at one or more time points after the sample flow is stopped.

The methods can have the target analyte concentration be measured at one or more time points after contacting the first reagent with the sample.

The methods described herein have the target analyte detected using a first detector comprising multiple light emitting diode light sources and multiple light emitting diode light detectors or a broad spectrum light source and a detector for measuring multiple wavelengths. Preferably, the first detector comprises at least two light emitting diode sources and at least two light emitting diode light detectors. More preferably, the first detector comprises at least three light emitting diode sources and at least three light emitting diode light detectors.

The methods can have the multiple light emitting diode sources each emit different wavelengths of light and the multiple light emitting diode light detectors detect those different wavelengths of light.

The target analyte concentration can be calculated by comparing an absorbance of the target analyte to an absorbance of a known concentration of the same analyte.

The target analyte concentration can be measured at one or more time points after contacting the first reagent and the second reagent with the sample.

The automated sensors or methods described herein can have the first reagent comprise potassium iodide, or a combination thereof.

The automated sensors or methods can have the second reagent comprises an acid, or a combination thereof.

The automated sensors or methods can have the rinse solution comprise sodium hypochlorite, an acid, a surfactant, a solvent, a cleaning agent, or a combination thereof.

Other objects and features will be in part apparent and in part pointed out hereinafter.

DETAILED DESCRIPTION

Figure 1:
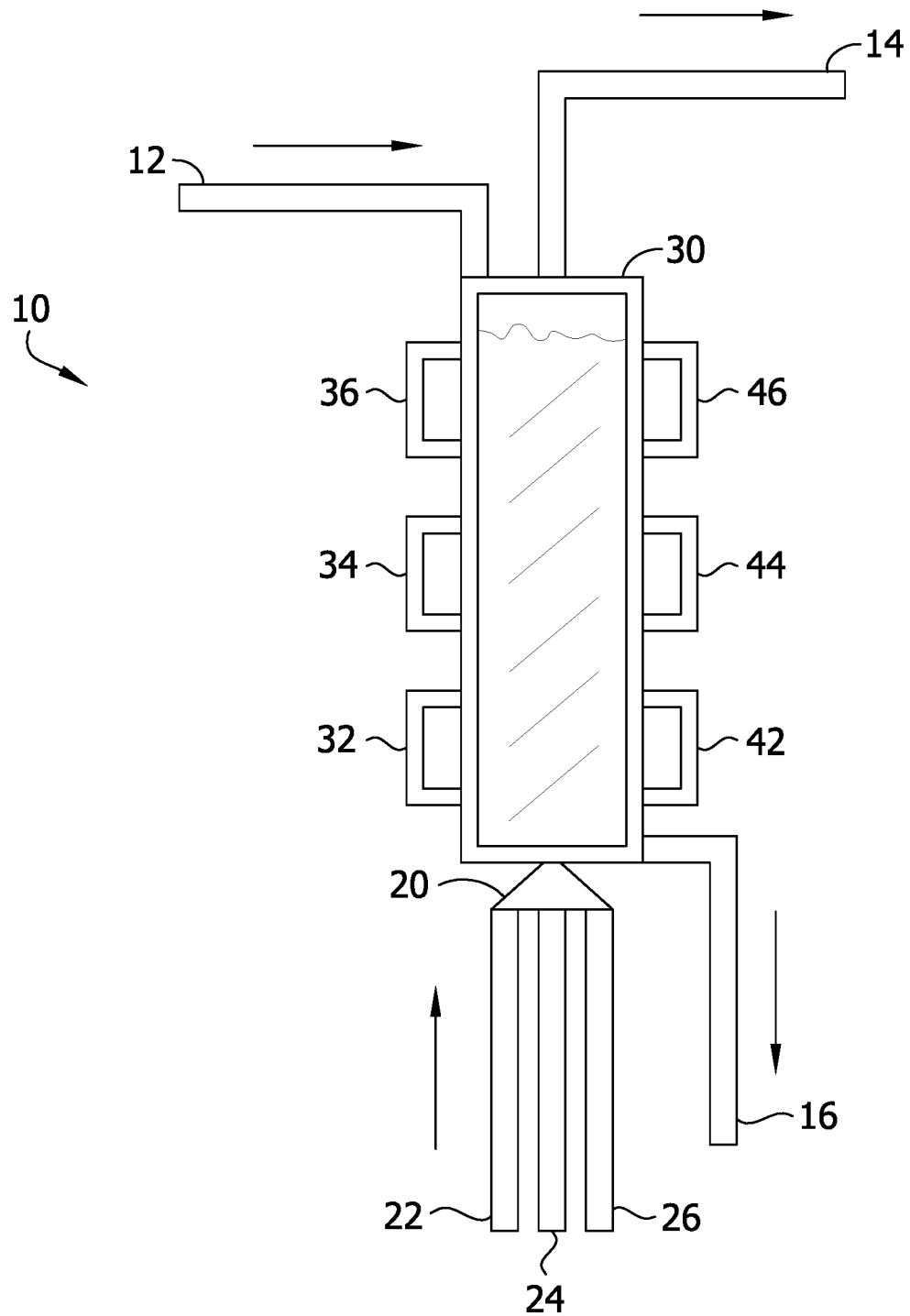
FIG. 1 is a schematic for an automated sensor having a sample pump, two reagent pumps, a rinse inlet, and a flow through waste line. The detector is a multi-wavelength detector.

Disclosed herein are automated sensor devices for measuring the concentration of a desired analyte by converting the analyte by reaction with a reagent or multiple reagents to a reaction product and methods for using the device. Advantageously, the automated sensor device has a system that continuously flows a sample of the analyte through the sensor device where additional reagents can be added to the continuously flowing sample.

The sensory system can include (1) a sample treatment system; (2) one or more reagents that react with the analyte; (3) a measurement chamber; (4) a detection device; and (5) a cleaning system.

The sample treatment system can include pumping and filtering the sample that removes particulate and other matter. Provided the filtration mechanism does not react with the analyte, removal of the particulate and other matter prevents damage of the sensor system and does not interfere with the analyte concentration.

The reagents that can react with the analyte to produce a species that is capable of being measured by the detector can be thoroughly mixed with the sample immediately before moving the sample and reagent mixture into the measurement chamber.

The sensor system can include a detector that measures the sample/reagent solution either while the solution is flowing, i.e., with a very short but known time after mixing the sample and reagent and sufficiently long to ensure complete reaction of the reagents with the desired analyte. The sensor system can also include a detector that measures the mixed sample and reagent solution when the mixed sample and reagent solution flow is stopped and a slow reacting analyte at one or more time points after flow stoppage is measured to permit measurement of an analyte concentration based on the change in the analyte reaction rate at differing analyte concentrations in a solution.

Also, the sensor system is capable of measuring the continuously flowing mixture of sample and reagent solution over time to follow a change in concentration of the analyte in the sample over time (due to growth or decay of the concentration of the analyte). Alternatively, the sensor system is capable of measuring a slowly reacting mixture of sample and reagent over time to follow a change in concentration of the analyte in the sample over time. This kind of measurement can be made using multiple flow/stop flow sampling (with or without stopping the flow to clean the device).

The sensor system also includes a system cleaning operation that can involve one or more sample, reagent or additional cleaning solutions that are flowed through the reaction cell to rinse out the mixture of sample and reagents used in earlier steps to measure the analyte as well as clean the reaction cell from any inorganic and/or organic or biological contamination from the sample. A solution draining operation can also be employed to remove solution from the measurement chamber to eliminate precipitates and/or bubbles from forming in the measurement chamber between measurements. Advantageously, this cleaning system provides the sensor system with a way to reduce the impact of contaminated solutions that can leave a residue between measurements or precipitate scale from inorganics, organic, microbial, and protein contamination and/or difficult to remove bubbles that form over time. These problems would be more pronounced if the sample and/or reagent solutions remain in the reaction chamber of the sensor system.

In particular, disclosed herein are sensors and methods of sensing analytes that provide advantageous dynamic range for measuring kinetics of reactions. For example, disclosed is an automated sensor comprising a sample treatment system comprising a sample pump and a sample filter. The sample pump is for pumping a sample into a reaction manifold, wherein the sample comprises an analyte. The sensor comprises a first reagent pump for pumping a first reagent into the reaction manifold; the reaction manifold for mixing the sample with the first reagent, the reaction manifold being in fluid communication with the sample treatment system and the first reagent pump. The sensor also comprises a measurement chamber in fluid communication with the reaction manifold; and a first detector in fluid communication with the measurement chamber for detecting a property of the analyte in the measurement chamber. The sensor further comprises a waste line for removing waste from the measurement chamber and having a fluid communication to the measurement chamber; a waste pump in fluid communication with the waste line for removing the sample and the first reagent from the sensor. The sensor also comprises a rinse line in fluid communication with the measurement chamber; and a controller communicatively coupled to the sample pump, the first reagent pump, and the first detector, wherein the controller controls the sample pump to set the flow rate of the sample, controls the first reagent pump to set the flow rate of the first reagent, and receives data from the detector to detect the property of the analyte.

The waste line for removing waste from the measurement sensor is in fluid communication with the waste pump and the waste pump is capable of aspirating the contents of the measurement chamber and pumping it to a waste container that is in fluid communication with the waste line.

The automated sensors described herein can have the sample is a continuously flowing and refreshed sample.

The automated sensor can further comprise a rinse pump for pumping a rinse solution and being in fluid communication with the rinse line and the measurement chamber.

The automated sensor can also further comprise a second reagent pump for pumping a second reagent into the reaction manifold and being in fluid communication with the reaction manifold.

The automated sensor can have the first detector be a light emitting diode detector, a conductivity detector, an electrochemical detector, a ultraviolet detector, a visible light detector, an infrared light detector, a Raman detector, a Fourier transform infrared detector, a broad spectrum detector, or a nuclear magnetic resonance detector. Preferably, the first detector is a light emitting diode detector.

The broad spectrum detector can be a Hamamatsu C12666MA.

The first detector can comprise multiple light emitting diode light sources and multiple light emitting diode light detectors. Preferably, the first detector comprises at least two light emitting diode sources and at least two light emitting diode light detectors. More preferably, the first detector comprises at least three light emitting diode sources and at least three light emitting diode light detectors.

The multiple light emitting diode sources can each emit different wavelengths of light and the corresponding multiple light emitting diode light detectors detect those different wavelengths of light.

The multiple light emitting diodes each emitting light at different wavelengths provides for an increased response range and sensitivity. When more than one light emitting diode emits the same wavelength of light, verification of the measurement is provided.

The reaction product preferably can be detected colorimetrically and has different properties than the reactants. The product of the analyte-reagent reaction will have a light absorbance at a given wavelength that can be calibrated such that calculation of the analyte concentration in the measured solution can obtained. The sensor device can also contain multiple light sources (e.g., LED) to permit simultaneous measurement by multiple wavelengths of light. Based on the ultraviolet-visible spectrum of a given analyte, LED wavelengths can be chosen to permit a broadening of the dynamic range of the instrument with one LED wavelength measuring the absorbance change of the analyte at very low concentrations where the analyte exhibits a higher absorption coefficient while other LED wavelengths could measure higher concentration analyte containing solutions where the analyte exhibits lower absorption coefficients. Choosing multiple wavelengths for simultaneous measurements can provide a very broad system dynamic range for samples having highly variable analyte concentrations.

Alternatively, a broad spectrum light source and a multi-wavelength detector could be used in place of discrete LED light sources and corresponding single wavelength detectors. The broad spectrum light source could be detected at any of the wavelengths that the multi-wavelength detector is capable of measuring. This detector system would provide the same advantages as the multiple LED light system and include a large dynamic range and ability to measure different analytes using specific properties that are advantageous for sensitivity and precision for measuring a particular analyte.

The use of a multiple wavelengths in the measurement for a colorimetric measurement permits the choice of a wavelength of light that has sufficient absorbance of the analyte to distinguish from background noise while not too high to saturate the analyte absorbance. Judicious choice of the measurement wavelength allows response to be optimized for the colored species and for the desired analyte concentration range to be quantified in the industrial/commercial process.

The automated sensor has the reaction manifold placed downstream from the sample treatment system and first reagent pump.

The automated sensor described herein can have the measurement chamber be downstream from the reaction manifold.

The automated sensor has the first detector located within the measurement chamber.

The automated sensor can further comprise a second detector downstream from the first detector.

The disclosure is also directed to a method for quantification of a target analyte concentration in a sample. The method comprises flowing the sample through an analyzer comprising a reaction manifold, a measurement chamber comprising a detector, and a waste line. The method also comprises flowing a first reagent through the analyzer to contact the sample; detecting a property of the target analyte and calculating the concentration of the target analyte in the sample. The method additionally includes rinsing the analyzer by flowing a rinse solution through the analyzer; and draining the analyzer by pumping the sample, the first reagent, and the rinse solution out of the analyzer.

The methods described herein have a second reagent flowed through the analyzer to contact the sample.

The methods have an internal standard flowed into the analyzer with the sample and the internal standard contains a known concentration of a known analyte.

An internal standard can be used at known concentrations in place of the sample or in addition to the sample to provide validation of the accuracy of the automated sensor for a given analyte during an automated operation at any time between sample analyte measurements. The use of an internal standard would be automated by adding it at a known rate at the same time as the reagents and/or reagent-sample additions. Comparing the internal standard known concentration to the calibration concentration would permit automatic adjustment of the calibration calculation stored in the system computer control memory to take into account systematic effects (such as contamination interferences of the system by the sample solution) during system operation.

The methods have the sample continuously flowed through and refreshed in the analyzer.

The methods described herein can have the flow of the sample stopped and the target analyte concentration measured at one or more time points after the sample flow is stopped.

The methods can have the target analyte concentration be measured at one or more time points after contacting the first reagent with the sample.

The methods described herein have the target analyte detected using a first detector comprising multiple light emitting diode light sources and multiple light emitting diode light detectors or a broad spectrum light source and a detector for measuring multiple wavelengths. Preferably, the first detector comprises at least two light emitting diode sources and at least two light emitting diode light detectors. More preferably, the first detector comprises at least three light emitting diode sources and at least three light emitting diode light detectors.

The methods can have the multiple light emitting diode sources each emit different wavelengths of light and the multiple light emitting diode light detectors detect those different wavelengths of light.

Alternatively, the methods could use a broad spectrum light source and a multi-wavelength detector in place of discrete LED light sources and corresponding single wavelength detectors. The broad spectrum light source could be detected at any of the wavelengths that the multi-wavelength detector is capable of measuring. As described above, this system would have similar advantages of a broad spectrum light source and a multi-wavelength detector could be used in place of a large dynamic range and ability to measure different analytes using specific properties that are advantageous for sensitivity and precision for measuring a particular analyte.

The target analyte concentration can be calculated by comparing an absorbance of the target analyte to an absorbance of a known concentration of the same analyte.

The target analyte concentration can be measured at one or more time points after contacting the first reagent and the second reagent with the sample.

The automated sensors or methods described herein can have the first reagent comprise potassium iodide, or a combination thereof.

The automated sensors or methods can have the second reagent comprises an acid, or a combination thereof.

The automated sensors or methods can have the rinse solution comprise sodium hypochlorite, an acid, a surfactant, a solvent, a cleaning agent or a combination thereof.

FIG. 1 is a schematic representation of the automated sensor device 10. The automated sensor device includes a sample pump 22, a first reagent pump 24, and a second reagent pump 26. The sample pump 22, first reagent pump 24, and second reagent pump 26 are connected to and in fluid communication with a reaction manifold 20. The reaction manifold 20 is connected to and in fluid communication with a measurement chamber 30. The measurement chamber 30 is in fluid communication with a rinse line 12 and a waste line 14. The waste line 14 is a flow through waste line that is in fluid communication with a waste pump 16. The waste pump 16 facilitates the system in emptying the waste line 14 and measurement chamber 30 of all solutions when required.

The automated sensor also contains measurement detectors. The sensor of FIG. 1 includes a first light source 32, a second light source 34, and a third light source 36. These light sources emit different wavelengths of light. The sensor also includes a first detector 42, a second detector 44, and a third detector 46, that detect the wavelength of light emitted by the corresponding light source.

In one case, the light sources are light-emitting diodes (LED) and the LED light is transmitted through transparent tubing containing the analyte solution permitting the changes in the absorbed LED light to be compared to the absorbed LED light of a control solution not containing analyte. The concentration of the analyte then is obtained by comparing the absorbance of the analyte solution to that of a calibration curve developed from absorbances obtained using known analyte concentrations.

Alternatively, other detection devices such as conductivity, electrochemical analysis, other UV, visible or IR light wavelengths (or light transmission detectors such as Raman or FTIR spectroscopy), NMR or other devices that can differentiate a reagent-analyte combination solution can also be used in place of this detection system using the same solution flow apparatus. Additional detectors, described above, can also be implemented downstream from the primary detector block shown in FIG. 1.

The automated apparatus in FIG. 1 specifically describes one configuration for a measurement system although it can be reconfigured to measure the concentration of other analytes in solution by using one or more alternative reagents that react with that specific analyte to permit a concentration measurement. In particular, the apparatus can be used to measure the peracetic acid and hydroperoxide concentrations by a colorimetric measurement.

During the analysis process it has been shown that a unique optical cell rinsing method is advantageous. The cell can be automatically rinsed with cleaning reagents to remove all trace of reaction products as well as organic and inorganic contamination from the optical cell that may result in cross-contamination with subsequent samples or block light transmission through the optical cell if not removed. Additionally, the cell can be automatically evacuated using an aspiration pump to avoid the precipitation over time of sample contaminants (inorganic, organic and/or biological)

between measurements of varying lengths of time. Such an operation can also minimize air bubbles that can adhere to and block the optical path.

Peroxyacetic acid reacts nearly instantly with iodide in mildly acidic media whereas hydrogen peroxide reacts more slowly. This allows for the quantification of peracid and peroxide concentrations within the same sample by continuously monitoring the reaction in real time. Additional reagents may be added to increase the rate of the hydrogen peroxide reaction after the peracid measurement is completed or the two measurements could be run alternatively with different reagent sets, each being monitored continuously over time to determine concentration changes of the analytes in the sample over time.

Alternatively, the flow can be stopped before (as a control solution) or after one or more reagents have been mixed with the analyte solution to permit measurement of the analytes reaction with the reagents over time. Stopping the flow after addition of reagents that react with an analyte permits the system to continuously measure the analyte concentration over time and determine the reaction rates between reagents and the analyte over time in a very controlled manner.

A wide variety of reagents known for analyte concentration measurement can be used, and a sufficient addition of reagent will cause the sample to change. In this continuous-mode operation, however, the determining factor of "sufficient addition of reagent" corresponds to the rate of reagent addition and concentration relative to the sample flow (and sample concentration). This is because the sample is flowing through the system continuously so fresh sample is continuously fed into the reaction manifold 20 through the sample pump 22.

Accordingly, if the reagent is added too slowly, it will fail to adequately react with the process sample and the process sample may not change. Put another way, in a given amount of time, a certain volume of sample will flow through a particular point in the system. In order to achieve the desired change, then, there needs to be an appropriate volume of reagent that also flows past this point during the same time, which corresponds to a sufficient flow rate. The process can be automated by a controller such as a programmable logic controller (PLC), using feedback mechanisms from the detector.

The flow rate of the reagent can be changed by an amount that is nonlinear over time. An exponential increase in flow rate, for example, will begin by making small changes in the flow rate while the concentrations involved are small. Over time, as the concentrations become larger (since the flow rate has continued to increase), small changes in flow rate become unnecessarily precise compared to the concentrations at hand and the flow rate can increase by larger amounts.

A low concentration of analyte can be accurately resolved by the small changes in concentrations early in the process, while large concentrations of analyte can be titrated in a shorter amount of time since the rate of reagent addition increases more rapidly over time.

For example, a low concentration of peroxide and peracid can be accurately resolved by the small changes in concentrations early in the process, while large concentrations of peracid and/or peroxide can be titrated in a shorter amount of time since the rate of titrant addition increases more rapidly over time.

The method described herein can have a variable flow rate of the sample be from about 1 mL/minute to about 200 mL/minute.

The method described herein can have a variable flow rate of the sample be from about 1 mL/minute to about 175 mL/minute, from about 1 mL/minute to about 150 mL/minute, from about 1 mL/minute to about 125 mL/minute, from about 1 mL/minute to about 100 mL/minute, from about 1 mL/minute to about 75 mL/minute, from about 1 mL/minute to about 50 mL/minute, from about 1 mL/minute to about 30 mL/minute, from about 2 mL/minute to about 200 mL/minute, from about 2 mL/minute to about 175 mL/minute, from about 2 mL/minute to about 150 mL/minute, from about 2 mL/minute to about 125 mL/minute, from about 2 mL/minute to about 100 mL/minute, from about 2 mL/minute to about 75 mL/minute, from about 2 mL/minute to about 50 mL/minute, from about 2 mL/minute to about 30 mL/minute, from about 5 mL/minute to about 200 mL/minute, from about 5 mL/minute to about 175 mL/minute, from about 5 mL/minute to about 150 mL/minute, from about 5 mL/minute to about 125 mL/minute, from about 5 mL/minute to about 100 mL/minute, from about 5 mL/minute to about 75 mL/minute, or from about 5 mL/minute to about 50 mL/minute.

For the methods described herein, the target analyte can comprise hydrogen peroxide, a peroxyacetic acid, performic acid, peroxyoctanoic acid, or a combination thereof. Preferably, the target analyte comprises hydrogen peroxide, a peroxy acid, or a combination thereof.

For the methods described herein, the reagent comprises potassium iodide, acetic acid, starch indicator, ammonium molybdate, or a combination thereof.

In each method described herein, the actual target analyte concentration can be directly detected or the actual target analyte concentration can be calculated from the detection of the concentration of a product of the reaction of the target analyte and the reagent.

The process is such that it can be implemented anywhere, such as at a sampling point in a processing facility or other industrial or commercial location not conducive to regularly performing standard titrations.

"Amount," as used herein, refers to a generic measureable quantity such as mass, concentration, volume, etc.

Having described the invention in detail, it will be apparent that modifications and variations are possible without departing from the scope of the invention defined in the appended claims.

EXAMPLES

The following non-limiting examples are provided to further illustrate the present invention.

Example 1: Field Kinetic Study

The automated sensor described herein is capable of monitoring the reaction rate of an analyte immediately after addition to a process, for example, in a highly soiled solution. A process water sample is introduced into the sensor at the point of the analyte injection to measure how long that analyte will remain a viable treatment for the process water.

In this case, a flowing stream of processed water can be required to travel a long distance from the treatment site over a period of time such that a treated process water may be difficult to monitor for an analyte downstream of the analyte injection point.

Also, in this case, the instrument can analyze the process water sample for analyte concentration immediately after the analyte injection and then hold the sample in the system and measure the analyte decay over a time period that represents the state of the treated process water at the difficult to measure site downstream of the treatment point. From this analyte decay curve, a predicted concentration for the analyte can be determined for any time downstream of the analyte injection point into the process water.

Figure 2:
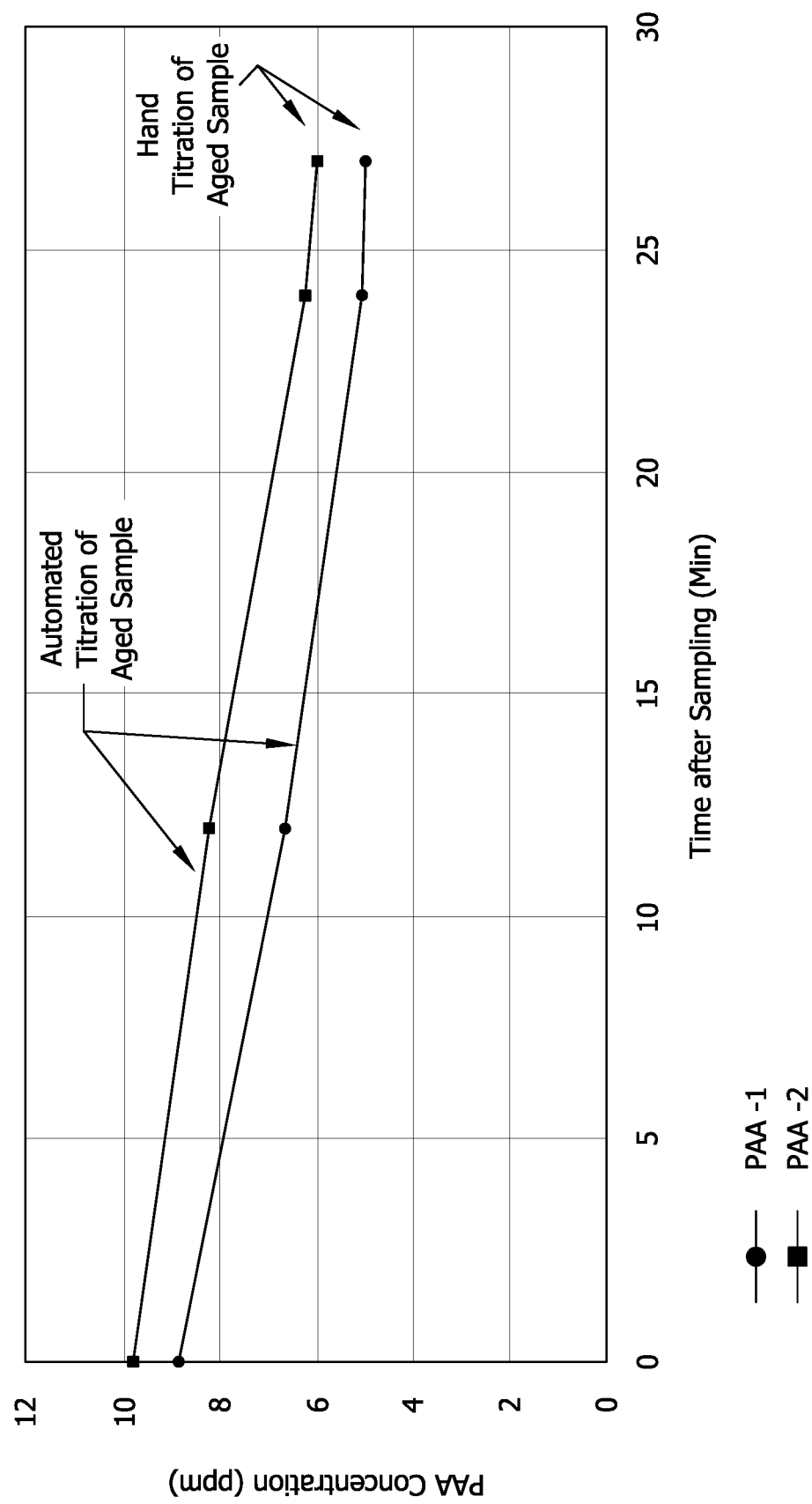
FIG. 2 is a graph of the peracetic acid (PAA) concentration versus the time after sampling in minutes for the automated titration at 0, 12, and 24 minutes after sampling and data for a hand titration of an aged sample.

FIG. 2 shows two such measurements of a continuously flowing process water treated with peracetic acid and then immediately measured for the peracetic acid concentration. Additionally, the same sample was held in the apparatus and subsequently measured at 12 minutes and 24 minutes after the initial injection of the peracetic acid analyte to measure the peracetic acid reaction with the water contaminants over time.

Oxidizable components of a water sample like that shown in FIG. 2 can include microbial contamination and/or hydrogen sulfide, both of which can be detrimental to the systems requiring the water for operational purposes. The results shown in FIG. 2 show the decay of peracetic acid over time in the treated water and that, depending on the contaminant level in the water, the same level of peracetic acid injected into the water can result in variable final concentration of the peracetic acid oxidizer.

Example 2: Kinetic Sanitizer Analysis

When the sanitizer is a peroxyacid-based chemistry with hydrogen peroxide, the sensor is capable of measuring both the peroxyacid and hydrogen peroxide using the difference in the reaction rates of the peracid and peroxide with iodide. Peroxyacetic acid reacts nearly instantaneously with iodide to form the triiodide complex. Hydrogen peroxide reacts much more slowly, and this reactivity difference allows for the two chemical species to be distinguished based on a kinetic assay.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the methods without departing from the scope of the invention, it is intended that all matter contained in the above description and shown in the accompanying drawings shall be interpreted as illustrative and not in a limiting sense.

What is claimed is:

1. An automated sensor comprising:
a sample treatment system comprising a sample pump and a sample filter, wherein the sample pump is configured for continuously pumping a continuously flowing and refreshed sample into a reaction manifold, wherein the sample comprises an analyte;
a first reagent pump for pumping a first reagent into the reaction manifold;
the reaction manifold configured for mixing the continuously flowing and refreshed sample with the first reagent, the reaction manifold being in fluid communication with the sample treatment system and the first reagent pump;
a measurement chamber in fluid communication with the reaction manifold;
a first detector in fluid communication with the measurement chamber for detecting a property of the analyte in the measurement chamber;
a waste line for removing waste from the measurement chamber and having a fluid communication to the measurement chamber;
a waste pump in fluid communication with the waste line, said waste pump is configured to aspirate the contents of the measurement chamber and pump the contents to a waste container that is in fluid communication with the waste line removing the sample and the first reagent from the sensor;
a rinse line in fluid communication with the measurement chamber; and
a controller communicatively coupled to the sample pump, the first reagent pump, the first detector, and the waste pump, wherein the controller is configured to control the sample pump, and to set the continuous flow rate of the continuously flowing and refreshed sample; and wherein the controller is configured to control the first reagent pump to set the flow rate of the first reagent, and further configured to receive data from the detector to detect the property of the analyte, and further configured to activate the waste pump to remove the sample and the first reagent from the automated sensor.

2. The automated sensor of claim 1, further comprising a rinse pump for pumping a rinse solution and being in fluid communication with the rinse linc and the measurement chamber.

3. The automated sensor of claim 1, further comprising a second reagent pump for pumping a second reagent into the reaction manifold and being in fluid communication with the reaction manifold.

4. The automated sensor of claim 1, wherein the first detector is a light emitting diode detector, a conductivity detector, an electrochemical detector, an ultraviolet detector, a visible light detector, an infrared light detector, a Raman detector, a Fourier transform infrared detector, or a nuclear magnetic resonance detector.

5. The automated sensor of claim 4, wherein the first detector is a light emitting diode detector.

6. The automated sensor of claim 5, wherein the first detector comprises multiple light emitting diode light sources and multiple light emitting diode light detectors.

7. The automated sensor of claim 6, wherein the first detector comprises at least two light emitting diode sources and at least two light emitting diode light detectors or wherein the first detector comprises at least three light emitting diode sources and at least three light emitting diode light detectors.

8. The automated sensor of claim 6, wherein the multiple light emitting diode sources each emit different wavelengths of light and the multiple light emitting diode light detectors detect those different wavelengths of light.

9. The automated sensor of claim 1, wherein the first detector comprises a broad spectrum light source and a multi-wavelength detector.

10. The automated sensor of claim 9, wherein the reaction manifold is downstream from the sample treatment system and first reagent pump.

11. The automated sensor of claim 10, wherein the measurement chamber is downstream from the reaction manifold.

12. The automated sensor of claim 11, wherein the first detector is located within the measurement chamber.

13. The automated sensor of claim 12, further comprising a second detector downstream from the first detector.

14. A method for quantification of a target analyte concentration in a sample comprising:
- flowing the sample through the automated sensor of claim 1;
- flowing a first reagent through the sensor to contact the sample;
- detecting a property of the target analyte and calculating the concentration of the target analyte in the sample;
- rinsing the sensor by flowing a rinse solution through the sensor; and
- draining the sensor by pumping the sample, the first reagent, and the rinse solution out of the sensor.

15. The method of claim 14, wherein a second reagent is flowed through the sensor to contact the sample.

16. The method of claim 15, wherein an internal standard is flowed into the sensor with the sample and the internal standard contains a known concentration of a known analyte.

17. The method of claim 16, wherein the sample is continuously flowed through and refreshed in the sensor.

18. The method of claim 17, wherein the flow of the sample is stopped and the target analyte concentration is measured at one or more time points after the sample flow is stopped and wherein the target analyte concentration is measured at one or more time points after contacting the first reagent with the sample.

19. The method of claim 17, wherein the target analyte is detected using a first detector comprising multiple light emitting diode light sources and multiple light emitting diode light detectors.

* * * * *